(12) United States Patent
Asher et al.

(10) Patent No.: US 9,124,570 B1
(45) Date of Patent: Sep. 1, 2015

(54) PROVIDING AN ASSESSMENT OF AUTHENTICATION REQUESTS

(71) Applicant: EMC Corporation, Hopkinton, MA (US)

(72) Inventors: Lior Asher, Tel Aviv (IL); Ayelet Biger Levin, Newton, MA (US); Marcelo Blatt, Modiin (IL)

(73) Assignee: EMC Corporation, Hopkinton, MA (US)

( * ) Notice: Subject to any disclaimer, the term of this patent is extended or adjusted under 35 U.S.C. 154(b) by 29 days.

(21) Appl. No.: 13/928,784

(22) Filed: Jun. 27, 2013

(51) Int. Cl.
*G06F 7/04* (2006.01)
*H04L 29/06* (2006.01)

(52) U.S. Cl.
CPC ..................................... *H04L 63/08* (2013.01)

(58) Field of Classification Search
CPC ....... H04L 63/08; H04L 63/0876; H04L 9/32; G06F 21/316; G06F 7/04; G06Q 20/4014; H04W 12/06; H04W 12/08
USPC ..................... 726/4, 1, 2, 3; 707/784; 705/44; 379/114.14
See application file for complete search history.

(56) References Cited

U.S. PATENT DOCUMENTS

| 8,621,586 | B1* | 12/2013 | Peer et al. | 726/7 |
| 2011/0225625 | A1* | 9/2011 | Wolfson et al. | 726/1 |
| 2013/0197998 | A1* | 8/2013 | Buhrmann et al. | 705/14.53 |

* cited by examiner

*Primary Examiner* — Brian Shaw
(74) *Attorney, Agent, or Firm* — Krishnendu Gupta; Jason A. Reyes

(57) ABSTRACT

There is disclosed herein a technique for use in providing an assessment of authentication requests. In one embodiment, the technique comprises obtaining authentication data that relates to an attribute of authentication requests in a current time period and a previous time period. The technique also comprises applying a weight to the authentication data that relates to the attribute of authentication requests in the previous time period and performing a computation involving the weighted authentication data and the authentication data that relates to the attribute of authentication requests in the current time period. The computation producing a computational result. The technique still further comprises providing the computational result for use in processing future authentication requests.

20 Claims, 5 Drawing Sheets

| 40 | IP1 | IP2 | IP3 | IP4 | IP5 |
|---|---|---|---|---|---|
| CURRENT | 10 | 10 | 2 | 1 | 1 |
| PERIOD 0 | 13 | 6 | 4 | 1 | 0 |
| PERIOD 1 | 4 | 0 | 18 | 4 | 0 |
| PERIOD 2 | 0 | 4 | 6 | 2 | 0 |
| PERIOD 3 | 5 | 11 | 23 | 3 | 0 |

FIG. 4

| 40 | IP1 | IP2 | IP3 | IP4 | IP5 |
|---|---|---|---|---|---|
| $\bar{S}_{Current}$ | 30.26 | 28.42 | 46.73 | 9.87 | 1 |
| $\bar{S}_{Period\ 0}$ | 21.19 | 19.27 | 46.79 | 9.27 | 0 |
| $\bar{S}_{Period\ 1}$ | 8.57 | 13.88 | 44.76 | 8.65 | 0 |
| $\bar{S}_{Period\ 2}$ | 4.78 | 14.52 | 27.99 | 4.87 | 0 |
| $\bar{S}_{Period\ 3}$ | 5 | 11 | 23 | 3 | 0 |

FIG. 5

PROVIDING AN ASSESSMENT OF AUTHENTICATION REQUESTS

TECHNICAL FIELD

The present invention relates generally to user authentication, and more particularly to providing an assessment of authentication requests.

BACKGROUND OF THE INVENTION

An anti-fraud network acts as a data hub obtaining and/or capturing fraud-related or potentially fraud-related information from multiple products and installations. Once obtained and/or captured, the anti-fraud network analyzes the data, sanitizes portions of the data as necessary, and creates a unified feed for subsequent use by all installations. By way merely of example, fraud-related information might include a list of internet protocol (IP) addresses (or other identifiers) used to generate and/or further fraud-related activities. Additionally, fraud-related information can include a list of genuine IP addresses not associated with fraud-related activities. The anti-fraud network can obtain such lists from multiple providers such as various product installations and/or entities.

Unfortunately, the above-described approach suffers from at least one disadvantage in that a fraudulent transaction received from a particular IP address that is included on a list can affect future transactions from the same IP address for a very long time even though the future transactions may not be fraudulent. This can lead to a high level of false positives.

SUMMARY OF THE INVENTION

There is disclosed a computer-implemented method for use in providing an assessment of authentication requests, wherein the method comprises: obtaining authentication data that relates to an attribute of authentication requests in a current time period and a previous time period; applying a weight to the authentication data that relates to the attribute of authentication requests in the previous time period; performing a computation involving the weighted authentication data and the authentication data that relates to the attribute of authentication requests in the current time period, wherein the computation produces a computational result; and providing the computational result for use in processing future authentication requests.

There is disclosed an electronic apparatus, comprising: a network interface; memory; and control circuitry coupled to the network interface and memory, the memory storing instructions, which, when carried out by the control circuitry, cause the control circuitry to: obtain authentication data that relates to an attribute of authentication requests in a current time period and a previous time period; apply a weight to the authentication data that relates to the attribute of authentication requests in the previous time period; perform a computation involving the weighted authentication data and the authentication data that relates to the attribute of authentication requests in the current time period, wherein the computation produces a computational result; and provide the computational result for use in processing future authentication requests.

There is further disclosed a computer program product having a non-transitory computer readable storage medium which stores a set of instructions for use in providing an assessment of authentication requests, the set of instructions, when carried out by computerized circuitry, causing the computerized circuitry to perform a method of: obtaining authentication data that relates to an attribute of authentication requests in a current time period and a previous time period; applying a weight to the authentication data that relates to the attribute of authentication requests in the previous time period; performing a computation involving the weighted authentication data and the authentication data that relates to the attribute of authentication requests in the current time period, wherein the computation produces a computational result; and providing the computational result for use in processing future authentication requests.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIGS. 4 and 5 are block diagrams illustrating authentication data in a database included in the environment of FIG. 1.

DETAILED DESCRIPTION

Figure 1:
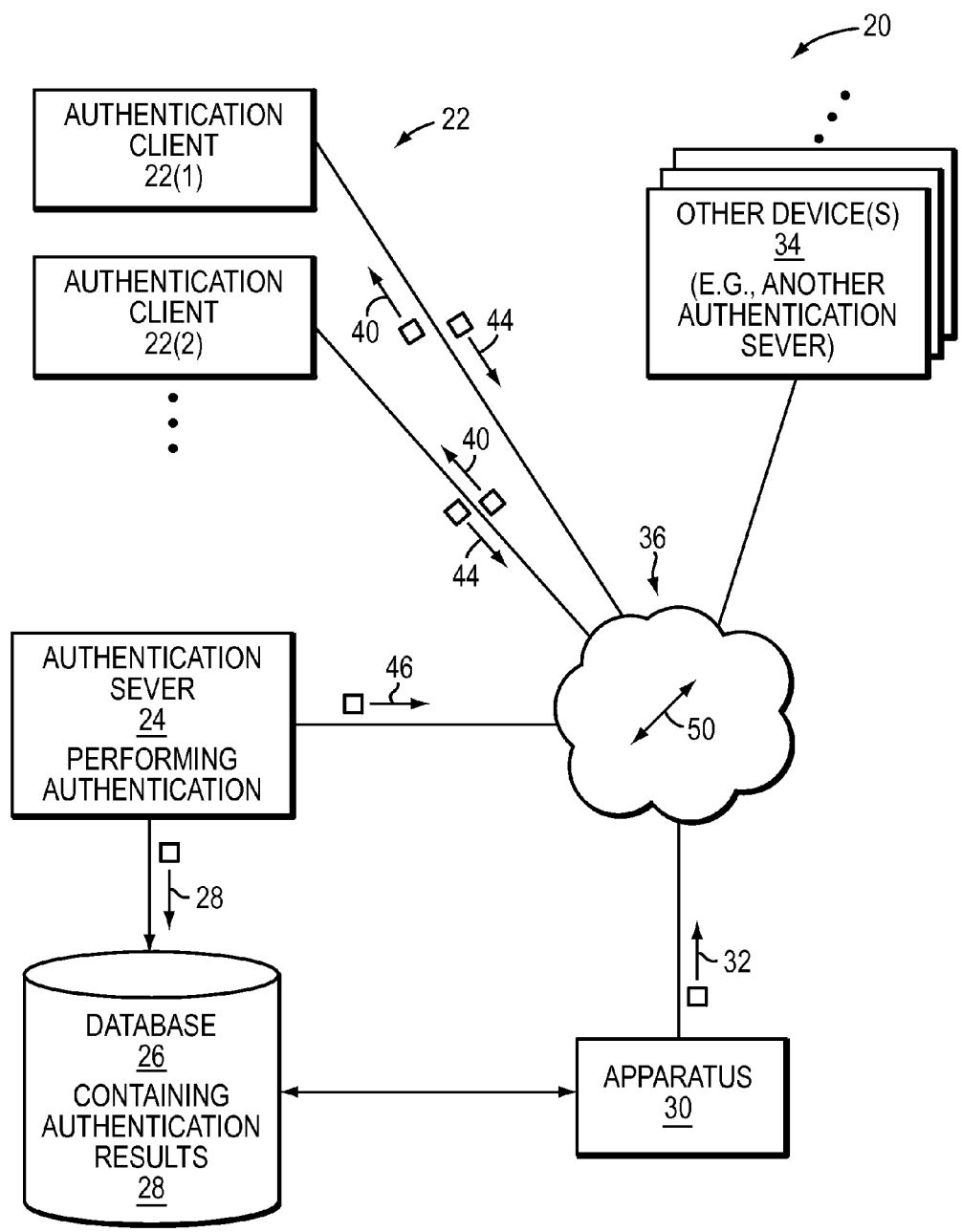
FIG. 1 is a block diagram illustrating an electronic environment which enjoys enhanced security by providing an assessment of authentication requests.

Referring to FIG. 1, there is illustrated an electronic environment 20 suitable for use in providing an assessment of authentication requests. The electronic environment 20 includes authentication clients 22(1), 22(2), . . . (collectively, authentication clients 22), an authentication server 24, a database 26 which stores authentication results 28, a specialized apparatus 30 to provide an assessment of authentication requests 32, one or more other device(s) 34, and communications medium 36.

The authentication clients 22 are constructed and arranged to control access to protected resources. As will be explained in further detail shortly, each authentication client 22 receives resource access requests 40 from users (e.g., account login attempts, transaction verification/confirmation attempts, etc.), and then communicates with the authentication server 24 to authenticate the users using authentication information (e.g., a user ID, a password and/or PIN, a one-time passcode, etc.). Examples of suitable authentication clients 22 include online stores, online banks/brokerages, file servers, VPN servers, building security systems, and so on.

The authentication server 24 is constructed and arranged to receive authentication requests 44 from the authentication clients 22, and perform authentication operations in response to the authentication requests 44 in order to authenticate the users. The authentication server 24 provides authentication responses 46 indicating whether authentication was successful back to the authentication clients 22. Additionally, the authentication server 24 stores the authentication results 28 including failed authentication attempts in the database 26.

The specialized apparatus 30 is constructed and arranged to provide an assessment of authentication requests 32 based on the authentication results 28 stored in the database 26. As will be explained in further detail below, the assessment 32 is based on an evaluation of failed attempts to authenticate users. The specialized apparatus 30 then outputs the assessment 32 for use in subsequent user authentication (e.g., sending the assessment 32 to the authentication server 24 in a feedback manner, storing the assessment 32 in the database 26, distributing the assessment 32 to other authentication servers such as the other devices 34, and so on). In some arrangements, the specialized apparatus 30 assigns a score to the assessment 32 (e.g., for use in adaptive authentication).

The other devices 34 represent other components of the electronic environment 20 such as members/subscribers of an anti-fraud network which receives the assessment 32 from the specialized apparatus 30 and utilizes the assessment 32 to protect access to resources. In some arrangements, multiple authentication servers share their authentication results for use in generating the assessment 32.

The communications medium 36 is constructed and arranged to connect the various components of the electronic environment 20 together to enable these components to exchange electronic signals 50 (e.g., see the double arrow 50). At least a portion of the communications medium 36 is illustrated as a cloud to indicate that the communications medium 36 is capable of having a variety of different topologies including backbone, hub-and-spoke, loop, irregular, combinations thereof, and so on. Along these lines, the communications medium 36 may include copper-based data communications devices and cabling, fiber optic devices and cabling, wireless devices, combinations thereof, etc. Furthermore, the communications medium 36 is capable of supporting LAN-based communications, SAN-based communications, cellular communications, combinations thereof, etc.

It should be understood that the database 26 was illustrated in FIG. 1 as being separate from the authentication server 24 and the specialized apparatus 30 by way of example only. In some arrangements, the database 26 is more tightly integrated with the authentication server 24 (e.g., co-located with or forms part of the authentication server 24). In other arrangements, the database 26 is more tightly integrated with the specialized apparatus 30 (e.g., co-located with or forms part of the specialized apparatus 30). In yet other arrangements, the authentication server 24 and the specialized apparatus 30 are formed by the same hardware. Along these lines, the hardware may continuously operate as the authentication server 24 but periodically operates (perhaps in an offline process) as the specialized apparatus 30 (e.g., nightly, weekly, monthly, etc.).

In some arrangements, the database 26 includes multiple smaller databases (e.g., local databases containing authentication results 28 for local authentication servers). In some arrangements, the database 26 stores authentication results 28 including successful authentication attempts as well.

Figure 2:
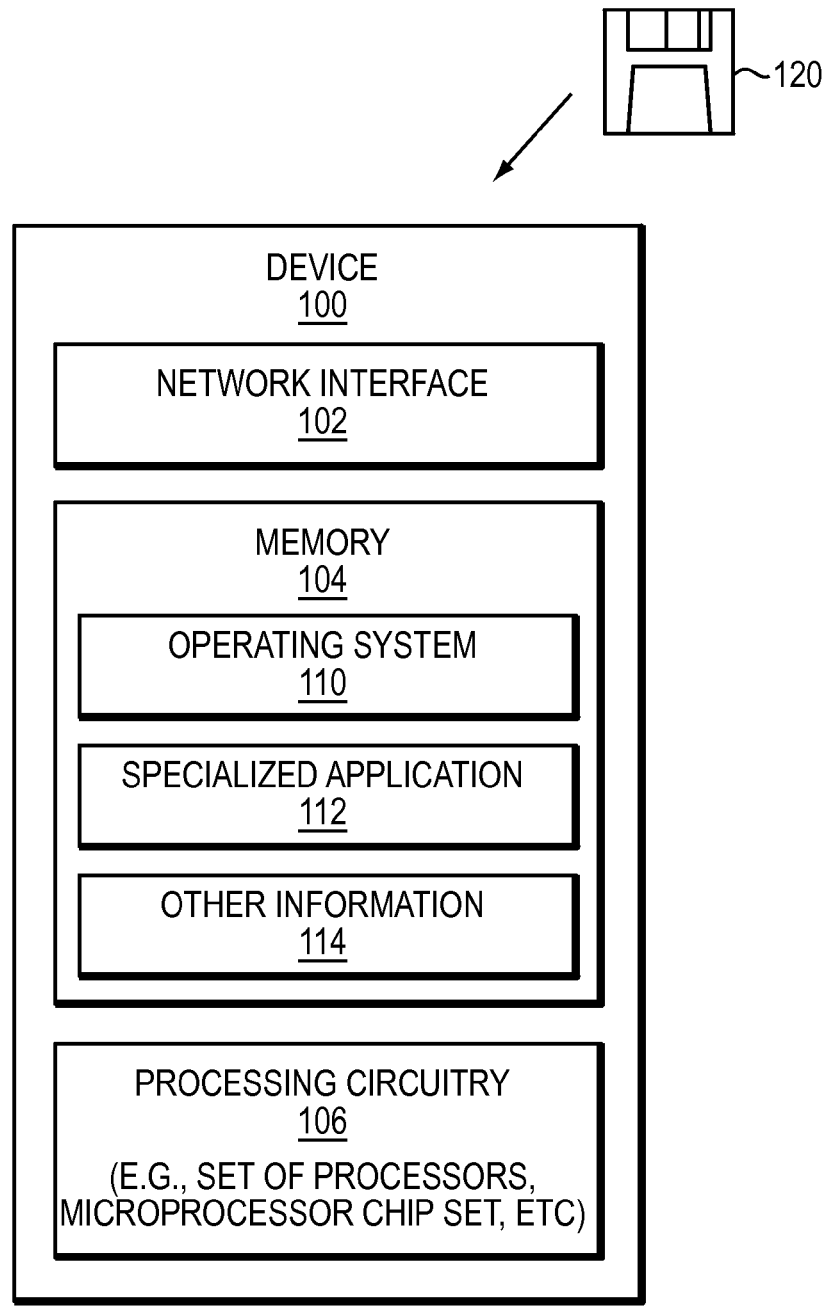
FIG. 2 is a block diagram illustrating particular details of a device included in the environment of FIG. 1.

Referring to FIG. 2, there is illustrated a device 100 which is suitable for use as the specialized apparatus 30. The device 100 includes a network interface 102, memory 104, and processing circuitry 106. The network interface 102 is constructed and arranged to connect the device 100 to the communications medium 36. Accordingly, the network interface 102 enables the device 100 to communicate with the other components of the electronic environment 20 (FIG. 1).

The memory 104 is intended to represent both volatile storage (e.g., DRAM, SRAM, etc.) and non-volatile storage (e.g., flash memory, magnetic disk drives, etc.). The memory 104 stores a variety of software constructs including an operating system 110, a specialized application 112, and other information 114.

The processing circuitry 106 is constructed and arranged to operate in accordance with the various software constructs stored in the memory 104. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 120 is capable of delivering all or portions of the software to the device 100. The computer program product 120 has a non-transitory (or non-volatile) computer readable medium which stores a set of instructions which controls one or more operations of the device 100. Examples of suitable computer readable storage media include tangible articles of manufacture and apparatus which store instructions in a non-volatile manner such as CD-ROM, flash memory, disk memory, tape memory, and the like.

During operation, the processing circuitry 106 executes the operating system 110 in order to manage particular computerized resources of the device 100 such as memory allocation and processor cycles. Additionally, the processing circuitry 106 executes the specialized application 112 to perform a process 150 for use in providing an assessment of authentication requests as will be described further below.

Figure 3:
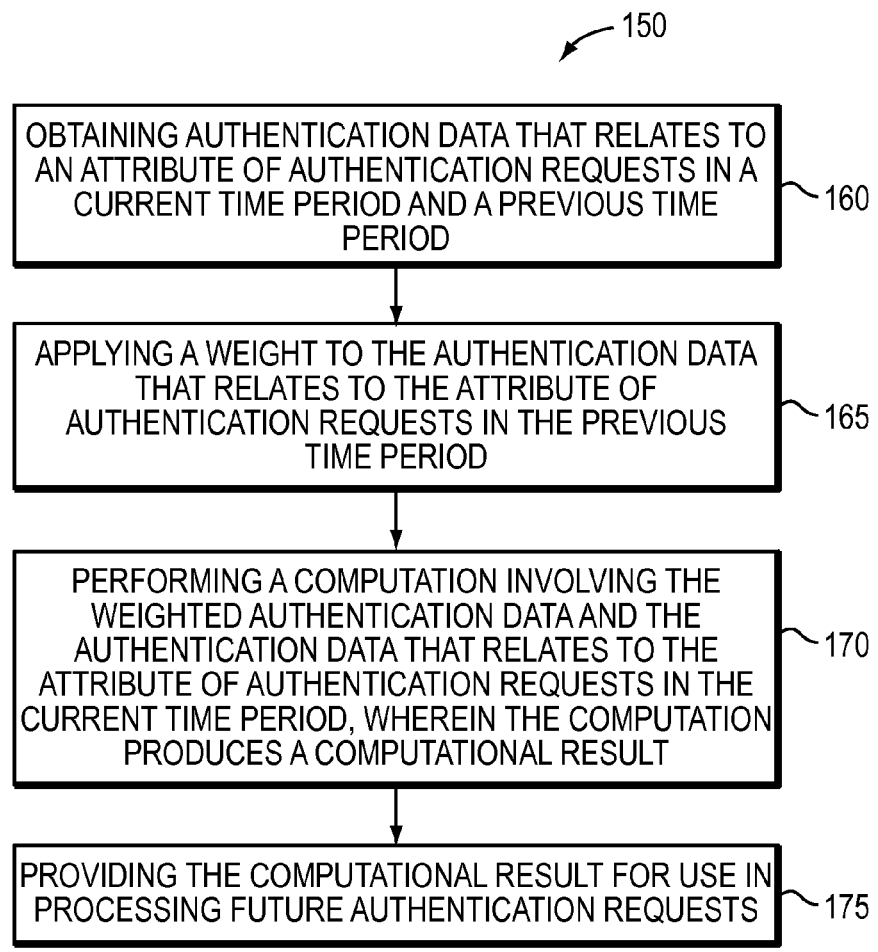
FIG. 3 is a flowchart illustrating a procedure which is performed by the device of FIG. 2 in the environment of FIG. 1.

Referring to FIG. 3, there is illustrated a flow chart of procedure 150 for use in providing an assessment of authentication requests. In the flow diagram, the operations are summarized in individual blocks. The operations may be performed in hardware, or as processor-executable instructions that may be executed by a processor. Furthermore, the procedure may, but need not necessarily, be implemented in the environment 20 of FIG. 1.

At step 160, the procedure comprises obtaining authentication data relating to an attribute of authentication requests in a current time period and a previous time period. In this particular case, the device 100 of FIG. 1 is configured to obtain authentication data relating to an attribute of authentication requests in a current and a previous time period from the authentication server 24 and/or database 26 and/or the other devices 34. Also, in this particular case, the authentication data relates to an IP address from which the user sent the resource access request 40 to the client 22. More precisely, the authentication data includes a count for the IP address that corresponds to the number of unsuccessful requests that have been received from this particular IP address in a particular time period. However, it should be appreciated that authentication data can relate to any attribute or characteristic associated with the request. For example, the attribute can be a user identifier, GPS location, etc.

At step 165, the procedure comprises applying a weight to the authentication data that relates to the attribute of authentication requests in the previous time period. In this particular case, the device 100 of FIG. 1 is also configured to apply the weight to the authentication data. Furthermore, in this particular case, the weight is dependent on the size of a selectable time window. For example, the size of the time window can correspond to the number of days in the window. It should be understood that such a weight is sometimes referred to as a smoothing factor that is sufficient to ensure that authentication data in a previous time period is given less significance as a result of time decay than similar authentication data in the current time period. This will also be described further below.

At step 170, the procedure comprises performing a computation involving the weighted authentication data and the authentication data that relates to the attribute of authentication requests in the current time period. The computation produces a computational result. It should be appreciated from the foregoing description that the device 100 is also configured to perform the computation. This will also be described further below.

At step 175, the procedure comprises providing the computational result for use in processing future authentication requests. It should be appreciated from the foregoing that the device 100 is configured to provide the computational result to authentication server 24. For example, the computational result can be included in the assessment 32 and fed back to the authentication server 24 in the form of a feedback loop. As another example, the assessment 32 may be distributed to multiple authentication servers, i.e., shared over central fraud networks and ecosystems. For example, the other devices 34.

In some arrangements, the assessment 32 includes the computational result so that it can be used in processing future adaptive authentication requests. In these arrangements, the assessment 32 can be used to update a model in the server 24 which is used to identify risky transactions.

Referring to FIG. 4, there is illustrated authentication data 40 that relates to an attribute of authentication requests in a current time period and four previous time periods. As illustrated, the authentication data relates to an IP address of authentication requests. In this case, the IP addresses are named 'IP1', 'IP2', 'IP3', 'IP4' and 'IP5', and each of the addresses has a corresponding count which indicates the number of unsuccessful authentication requests from the particular IP address in the time periods. For example, the IP address 'IP1' comprises a count of 10 unsuccessful requests for the current time period. Furthermore, the IP address 'IP1' comprises a count of 13 unsuccessful requests for the Period 0, and so on.

It should be appreciated that the counts which indicate the number of unsuccessful authentication requests from a particular IP address in a time period are included for illustration purposes only. They should not be considered as limiting in any way.

In use, the device 100 as described above performs the procedure 150 by obtaining the authentication data 40 for the current time period and the previous time period. In this particular case, the device 100 obtains the authentication data 40 for the current time period and the previous four time periods. The device 100 is configured to apply a weight to each of the previous time periods. The device 100 is also configured to perform a computation involving the weighted authentication data and the authentication data associated with authentication requests corresponding to the current time period.

In this particular embodiment, the coefficient α represents the degree of weighting decrease, which may be expressed in terms of a window of size d, as follows:

$$\alpha = \frac{d-1}{d+1}$$

For example, α is equal to 0.956 for a window of 45 days.

In this particular case, the device 100 performs the computation involving the weighted authentication data and the authentication data associated with authentication requests corresponding to the current time period using the following formula:

$$\overline{S}_t = \Sigma \alpha^u \cdot n_{(t-u)}$$

which can also be written as $$\overline{S}_t = n_t + \alpha \cdot n_{t-1} + \alpha^2 n_{t-2} + \alpha^3 \cdot n_{t-3} + \ldots + \alpha^{90} n_{t-90} + \ldots + \alpha^{180} n_{t-180} + \ldots$$

By applying the above formula, a weight applied to older authentication data ensures that it is given less significance as time progresses. For example, a weight α=0.956 is applied to authentication data for Period 0, a weigh α²=0.914 is applied to authentication data for Period 1, and so on.

Finally, the apparatus 100 provides the computational result as determined by the above formula to an authentication system or server 24 for use in processing and/or authenticating future authentication requests received at the authentication system Referring to FIG. 5, there is illustrated authentication data 40 after the procedure 150 as described above has been performed on the data of FIG. 4 for each of the time periods. The illustrated authentication data shows the computational result of the procedure 150 for each time period.

However, it should be understood that one of the difficulties associated with the approach described above is that the cost of storing data and processing data will increase as the number of time periods increases. Therefore, it is desirable to deal with the above difficulty while at the same time providing an assessment of authentication requests. This can be achieved in at least some embodiments by configuring the device 100 to perform the following formula at the end of each time period.

$$\overline{S}_t = n_t + \alpha \cdot \overline{S}_{t-1}$$

where
  $\overline{S}_t$ is an effective sum of the number of events at time t (the weighted sum at time t)
  $\overline{S}_{t-1}$ is an effective sum of the number of events at time t−1 (the weighted sum at time t−1)
  $n_t$ is an observed number of events at time t
  α is a constant smoothing factor between 0 and 1.

The above formula is equivalent to the formula as disclosed above with respect to FIG. 4, however the advantage being that over time the amount of data needed to be stored and processed actually decreases. The device 100 can perform the procedure 150 by obtaining the data for just two time periods (i.e., current and previous time periods), applying a weight to the authentication data associated with the previous time period, performing the computation and providing the result. It is, therefore, not necessary to store data for all the periods enabling savings on storage and the cost of real time processing.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

What is claimed is:

1. A method, comprising:
at an electronic apparatus comprising one or more processors; and memory, coupled to the one or more processors, the memory constructed and arranged to store instructions executable by the one or more processors, wherein the one or more processors executing instructions from the memory forms a specialized circuit for:
obtaining authentication data that relates to an attribute of authentication requests in a current time period and a previous time period;
applying a weight to the authentication data that relates to the attribute of authentication requests in the previous time period, wherein the weight is dependent on a size of a particular time window associated with the previous time period;
performing a computation involving the weighted authentication data and the authentication data that relates to the attribute of authentication requests in the current time period, wherein performing the computation comprises producing a computational result by summing the authentication data and the weighted authentication data; and
providing the computational result to an authentication system, wherein the provided computational result facilitates processing, by the authentication system, of future authentication requests comprising the attribute by being related to the attribute in a time period prior to the future authentication requests.

2. The method as claimed in claim 1, wherein the weight applied to the authentication data that relates to the attribute of authentication requests in the previous time period is dependent on the size of a selectable time window.

3. The method as claimed in claim 1, wherein the weight applied to the authentication data that relates to the attribute of authentication requests in the previous time period is sufficient to ensure that the authentication data is given less significance as a result of time decay than similar authentication data in the current time period.

4. The method as claimed in claim 1, wherein the authentication data relates to a similar attribute associated with unsuccessful authentication requests in the current time period and the previous time period.

5. The method as claimed in claim 1, wherein the authentication data relates to a similar IP address associated with unsuccessful authentication requests in the current time period and the previous time period.

6. The method as claimed in claim 1, wherein the authentication data relates to a similar location associated with unsuccessful authentication requests in the current time period and the previous time period.

7. The method as claimed in claim 1, wherein the authentication data relates to a similar user identifier associated with unsuccessful authentication requests in the current time period and the previous time period.

8. The method as claimed in claim 1, wherein the authentication data is obtained from a plurality of discrete authentication systems.

9. The method as claimed in claim 1, wherein the computational result is provided to a plurality of discrete authentication systems for use in processing future authentication requests received at the respective authentication systems.

10. The method as claimed in claim 1, wherein the computational result is provided to members of an anti-fraud network.

11. An electronic apparatus, comprising:
a network interface;
memory; and
control circuitry coupled to the network interface and memory, the memory storing instructions, which, when carried out by the control circuitry, cause the control circuitry to:
obtain authentication data that relates to an attribute of authentication requests in a current time period and a previous time period;
apply a weight to the authentication data that relates to the attribute of authentication requests in the previous time period, wherein the weight is dependent on a size of a particular time window associated with the previous time period;
perform a computation involving the weighted authentication data and the authentication data that relates to the attribute of authentication requests in the current time period, wherein performing the computation comprises producing a computational result by summing the authentication data and the weighted authentication data; and
provide the computational result to an authentication system, wherein the provided computational result facilitates processing, by the authentication system, of future authentication requests comprising the attribute by being related to the attribute in a time period prior to the future authentication requests.

12. The electronic apparatus as claimed in claim 11, wherein the weight applied to the authentication data that relates to the attribute of authentication requests in the previous time period is dependent on the size of a selectable time window.

13. The electronic apparatus as claimed in claim 11, wherein the weight applied to the authentication data that relates to the attribute of authentication requests in the previous time period is sufficient to ensure that the authentication data is given less significance as a result of time decay than similar authentication data in the current time period.

14. The electronic apparatus as claimed in claim 11, wherein the authentication data relates to a similar attribute associated with unsuccessful authentication requests in the current time period and the previous time period.

15. The electronic apparatus as claimed in claim 11, wherein the authentication data relates to a similar IP address associated with unsuccessful authentication requests in the current time period and the previous time period.

16. A computer program product having a non-transitory computer readable storage medium which stores a set of instructions for use in providing an assessment of authentication requests, the set of instructions, when carried out by computerized circuitry, causing the computerized circuitry to perform a method of:
obtaining authentication data that relates to an attribute of authentication requests in a current time period and a previous time period;
applying a weight to the authentication data that relates to the attribute of authentication requests in the previous time period, wherein the weight is dependent on a size of a particular time window associated with the previous time period;
performing a computation involving the weighted authentication data and the authentication data that relates to the attribute of authentication requests in the current time period, wherein performing the computation comprises producing a computational result by summing the authentication data and the weighted authentication data; and providing the computational result to an authentication system, wherein the provided computational result facilitates processing, by the authentication system, of future authentication requests comprising the attribute by being related to the attribute in a time period prior to the future authentication requests.

17. The computer program product as claimed in claim 16, wherein the weight applied to the authentication data that relates to the attribute of authentication requests in the previous time period is dependent on the size of a selectable time window.

18. The computer program product as claimed in claim 16, wherein the weight applied to the authentication data that relates to the attribute of authentication requests in the previous time period is sufficient to ensure that the authentication data is given less significance as a result of time decay than similar authentication data in the current time period.

19. The computer program product as claimed in claim 16, wherein the authentication data relates to a similar attribute associated with unsuccessful authentication requests in the current time period and the previous time period.

20. The computer program product as claimed in claim 16, wherein the authentication data relates to a similar IP address associated with unsuccessful authentication requests in the current time period and the previous time period.

\* \* \* \* \*